(12) United States Patent
Song et al.

(10) Patent No.: US 8,918,950 B2
(45) Date of Patent: Dec. 30, 2014

(54) MOBILE ROBOT SYSTEM HAVING A PLURALITY OF EXCHANGEABLE WORK MODULES AND METHOD OF CONTROLLING THE SAME

(75) Inventors: Jeong-gon Song, Gwangju (KR); Sam-jong Jeung, Gwangju (KR); Ju-sang Lee, Gwangju (KR); Jang-youn Ko, Gwangju (KR); Kwang-soo Lim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1930 days.

(21) Appl. No.: 11/362,145

(22) Filed: Feb. 27, 2006

(65) Prior Publication Data

US 2007/0050937 A1    Mar. 8, 2007

(30) Foreign Application Priority Data

Sep. 5, 2005  (KR) .................... 2005-82407

(51) Int. Cl.
*A47L 5/00* (2006.01)
*A47L 9/00* (2006.01)
*A47L 5/22* (2006.01)

(52) U.S. Cl.
CPC .............. *A47L 9/009* (2013.01); *A47L 5/225* (2013.01); *A47L 2201/00* (2013.01); *A47L 2201/02* (2013.01)
USPC .............................................. 15/319; 701/23

(58) Field of Classification Search
USPC ............... 15/319; 700/245, 200, 207; 701/23, 701/213, 2, 25, 24, 28
See application file for complete search history.

(56) References Cited

U.S. PATENT DOCUMENTS

| | | | |
|---|---|---|---|
| 4,604,787 A | 8/1986 | Silvers, Jr. | |
| 4,809,425 A | 3/1989 | Monforte | |
| 5,758,033 A * | 5/1998 | Bernstein et al. | 700/245 |
| 6,338,013 B1 * | 1/2002 | Ruffner | 701/23 |
| 6,600,981 B2 * | 7/2003 | Ruffner | 701/23 |
| 6,650,975 B2 * | 11/2003 | Ruffner | 701/23 |
| 7,066,291 B2 * | 6/2006 | Martins et al. | 180/167 |

(Continued)

FOREIGN PATENT DOCUMENTS

| | | |
|---|---|---|
| GB | 2409966 | 4/2005 |
| JP | 61083765 A | 4/1986 |

(Continued)

OTHER PUBLICATIONS

European Patent Office, Search Report issued Feb. 5, 2007, with respect to European Patent Application No. 06290564.1 filed on Apr. 6, 2006.

(Continued)

*Primary Examiner* — Monica Carter
*Assistant Examiner* — Stephanie Berry
(74) *Attorney, Agent, or Firm* — Blank Rome LLP

(57) ABSTRACT

Disclosed is a mobile robot system having a plurality of exchangeable work modules, thereby providing a mobile robot capable of performing various functions at a low cost. The mobile robot system comprises a plurality of work modules, which perform different works, respectively; a module station for connecting the plurality of work modules; and a mobile robot, which selects and connects to one of the plurality of work modules from the module station according to a work task to be performed. The mobile robot autonomously operates to perform the work task.

14 Claims, 6 Drawing Sheets

(56) References Cited

U.S. PATENT DOCUMENTS

| | | |
|---|---|---|
| 7,082,350 B2 * | 7/2006 | Skoog ............................ 700/245 |
| 7,108,731 B2 | 9/2006 | Park et al. |
| 7,173,391 B2 * | 2/2007 | Jones et al. ............... 318/568.12 |
| 2002/0049517 A1 * | 4/2002 | Ruffner ............................. 701/1 |
| 2002/0049522 A1 * | 4/2002 | Ruffner ........................... 701/23 |
| 2002/0156556 A1 * | 10/2002 | Ruffner ........................... 701/23 |
| 2003/0208302 A1 | 11/2003 | Lemelson et al. |
| 2004/0015266 A1 * | 1/2004 | Skoog ............................ 700/245 |
| 2004/0030448 A1 * | 2/2004 | Solomon ........................ 700/245 |
| 2004/0068351 A1 * | 4/2004 | Solomon .......................... 701/24 |
| 2005/0022485 A1 | 2/2005 | Park et al. |

FOREIGN PATENT DOCUMENTS

| | | |
|---|---|---|
| JP | 4058931 | 2/1992 |
| JP | 714842 | 3/1995 |
| JP | 10043879 | 2/1998 |
| JP | 11114857 | 4/1999 |
| JP | 11-197263 | 7/1999 |
| JP | 1020000028913 A | 5/2000 |
| JP | 2002093859 A | 3/2002 |
| JP | 2004-133882 | 4/2004 |
| JP | 2004-174228 | 6/2004 |
| JP | 2005-046926 | 2/2005 |
| JP | 200546591 | 2/2005 |

OTHER PUBLICATIONS

Korean Intellectual Property Office, Office Action issued Aug. 30, 2006, with respect to Korean Patent Application No. 2005-82407 filed on Sep. 5, 2005.

\* cited by examiner

MOBILE ROBOT SYSTEM HAVING A PLURALITY OF EXCHANGEABLE WORK MODULES AND METHOD OF CONTROLLING THE SAME

CROSS-REFERENCE TO RELATED APPLICATIONS

This application claims the benefit of Korean Patent Application No. 10-2005-0082407 filed with the Korean Intellectual Property Office on Sep. 5, 2005, the disclosure of which is incorporated herein by reference.

BACKGROUND OF THE INVENTION

1. Field of the Invention

The present invention relates to mobile robots, and in particular to a mobile robot system having a plurality of exchangeable work modules and a method of controlling the same.

2. Description of the Related Art

In general, a mobile robot means a robot which autonomously operates so as to perform a given work task, such as cleaning. Recently, among such mobile robots, cleaning robots, which can perform vacuum-cleaning, form a new market, the scale of which is increasing. In order to increase percent market share, various cleaning robots are being marketed which can perform various functions beyond basic vacuum-cleaning. At present, cleaning robots can perform functions of scrubbing, cleaning with steam, air-cleaning, humidifying, etc.

However, there is a problem with currently available mobile cleaning robots that are available to users who desire a multi-functional cleaning robot, because they can perform merely one or two functions.

If various functions as mentioned above are integrated in a single cleaning robot in order to solve the above-mentioned problem, the size and weight of the cleaning robot will need to be larger. As such, the capacitance of a driving motor for the cleaning robot also must become larger, but there is a problem with larger systems in that the manufacturing costs of such a cleaning robot will be greatly increased.

In addition, there is also a problem with such larger, multi-purpose mobile robots in that because a user purchases a multi-functional cleaning robot for performing various functions, an enormous burden of cost will be imposed on the user if the user requires only one or some of the various functions.

SUMMARY OF THE INVENTION

Accordingly, the present invention has been made to solve the above-mentioned problems occurring in the prior art. An object of the present invention is to provide a mobile robot system having a plurality of exchangeable work modules, so that various tasks can be performed by the mobile robot system without greatly increasing the manufacturing costs, and a method of controlling the same.

In order to achieve the above-mentioned object, there is provided a mobile robot system having a plurality of exchangeable work modules comprising: a plurality of work modules which perform different work tasks, respectively; a module station for connecting the plurality of work modules; and a mobile robot, which selects and connects to one of the plurality of work modules at the module station according to a task to be done, and which is adapted to performing the work while autonomously running.

Here, the mobile robot may comprise: a body; a driving part provided in the body; a module docking part provided on one side of the body adapted to connecting to one of the plurality of work module; an electric connection part installed proximate the module docking part on the one side of the body so as to supply electric power to the work module connected to the mobile robot; a signal connection part installed proximate the electric connection part so as to exchange signals with the work module connected to the mobile robot; and a robot controller provided in the body so as to control the driving part, so that the module docking part, the electric connection part, and the signal connection part are connected to the one selected from the plural work modules.

At this time, it is preferable that the robot controller stores a plurality of moving paths, which correspond to the plurality of work modules, respectively, such that the robot controller selects one moving path, which corresponds to the work module connected to the module docking part, among the plural moving paths, and controls the mobile robot so that it operates along the selected moving path and performs the work task.

In addition, each of the plurality of work modules may comprise: a module body; a work part provided in the module body that performs a given work task; a mating connecting part provided on one side of the module body adapted to being connected to a corresponding module connecting part of the module station; a mating docking part provided on a different side of the module body so as to be connected to the module docking part of the mobile robot; and a mating signal connection part and mating electric connection part provided on still another side of the module body, the mating signal connection part and the mating electric connection part being connected with the signal connection part and the electric connection part of the mobile robot, respectively.

At this time, the work parts of the plurality of work modules may comprise a vacuum-cleaning device, a scrubbing device, a sterilizing device, and an air-cleaning device, respectively.

In addition, the module docking part is preferably formed from an electromagnet.

According to another aspect of the present invention, there is provided a method of controlling a mobile robot system comprising the steps of: a) selecting a work module to be used in performing a given work task by a mobile robot among a plurality of work modules located in a module station; b) determining whether a work module connected to the mobile robot is the work module to be used in performing the given work tasks when such a work module is connected to the mobile robot; c) removing and connecting the work module, which is connected to the mobile robot, to the module station if the work module is not the work module to be used in performing the given work task; d) causing the mobile robot to connect to the work module to be used in performing the given work task in the module station; and e) causing the mobile robot to perform the given work task using the work module connected to the mobile robot.

Here, step c) may comprise the steps of: confirming the position of the work module to be used in performing the given work task by the mobile robot; causing the mobile robot to move and connect to the work module to be used in performing the given work task; causing the mobile robot to transmit a docking completion signal; and causing the module station to release the work module to be used when the docking completion signal is received.

In addition, step d) may comprise the steps of: confirming the position in the module station for removing and connecting to the work module, which is connected to the mobile robot, to the module station; causing the mobile robot to connect to the work module, which is connected to the mobile robot, to the confirmed position in the module station; and causing the mobile robot to remove the work module and then move away from the module station.

According to the inventive, the mobile robot system includes a plurality of exchangeable work modules and a method of controlling the same, whereby the mobile robot is adapted to perform a given work task while operating with only one work module among various work modules which have different functions respectively. Accordingly, the size and weight of the mobile robot is not increased as compared with a conventional mobile robot.

In addition, because the mobile robot can select a work module capable of performing a required function from a plurality of work modules which are connected to a module station and have various functions, it is possible to perform various work tasks as desired by a user. Accordingly, it is possible to perform various work tasks without substantially increasing the manufacturing costs of the mobile robot.

Furthermore, according to the inventive, the mobile robot system includes a plurality of exchangeable work modules and a method of controlling the same, such that it is possible to extend the function of the mobile robot by purchasing one or more work modules as desired by the user because the work modules and the module station are modularized according to the functions thereof. That is, it is possible for a user to initially purchase a module station having a charge unit, a module connecting part, and a mobile robot having a cleaning module, and then purchase a scrubbing module and another module connecting part at a later time, thereby extending the module station so that the function of the mobile robot can be extended from the cleaning function to the scrubbing function. Therefore, the burden of cost imposed on the user is not significant.

BRIEF DESCRIPTION OF THE DRAWINGS

The above aspects and features of the present invention will be more apparent from the description of certain embodiments of the invention taken with reference to the accompanying drawings, in which.

DETAILED DESCRIPTION OF THE PREFERRED EMBODIMENTS

Figure 1:
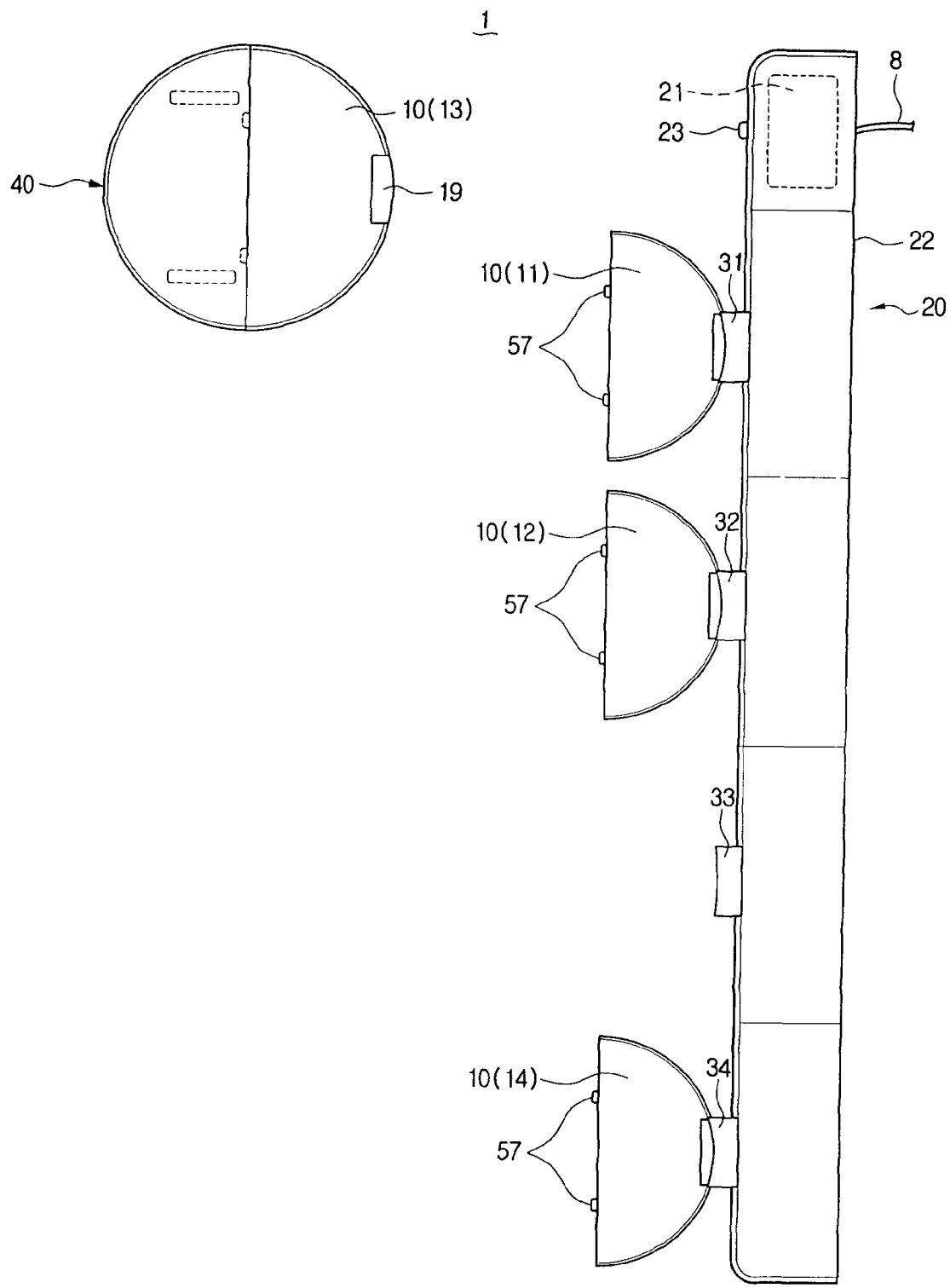
FIG. 1 is a top plan view showing an embodiment of a mobile robot system having a plurality of exchangeable work modules according to the present invention.
Figure 2:
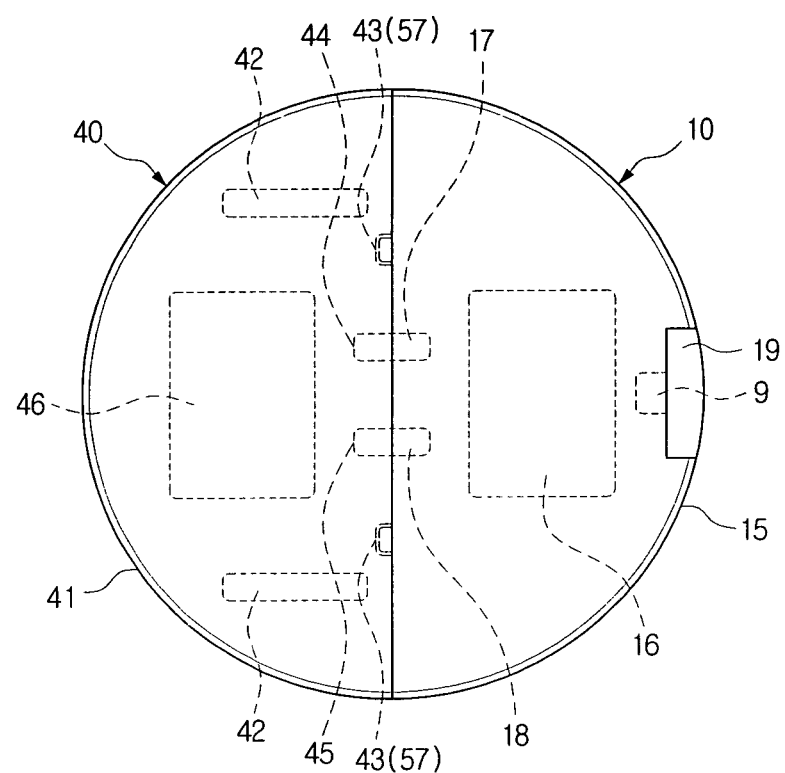
FIG. 2 is a top plan view showing a mobile robot connected to a work module in the mobile robot system shown in FIG. 1.

Hereinbelow, the preferred embodiments of the present invention are described in detail with reference to the accompanying drawings. In particular, a cleaning robot having a vacuum cleaning function is described below as a representative example of a mobile robot it being understood the other functions of other work modules is also part of the invention.

Referring to FIGS. 1 to 4, a mobile robot system 1 having plural exchangeable work modules according to an embodiment of the present invention is shown comprising a plurality of work modules 10, a module station 20, and a mobile robot 40.

Each work module 10 comprises a module body 15, a work part 16, a mating part 19, a mating docking part 57, a mating signal connection part 18, and a mating electric connection part 17.

The work part 16 is provided in the module body 15 so as to perform a given work task. The work part 16 may be provided with various means according to the function performed by the work module 10. For example, a work module capable of vacuum-cleaning (hereinafter, referred to as "cleaning module") is provided with a vacuum cleaning device at the work part. The vacuum cleaning device comprises a suction port for suctioning soil, which is provided at the bottom side of the module body 15, so that it can perform vacuum cleaning, a suction part for generating suction force, and a dust collection part for separately collecting suctioned soil. In addition, if the work module is a work module capable of scrubbing (hereinafter, referred to as "scrubbing module"), a scrubbing cleaning device is provided at the work part 16. Furthermore, if the work module has a steam cleaning function (hereinafter, referred to as "steam cleaning module"), a steam cleaning device is provided, and if the work module has a sterilizing function (herein after, referred to as "sterilizing module"), a sterilizing device is provided. Because the devices for respectively implementing the above-mentioned functions are well-known techniques, detailed descriptions thereof are omitted.

The mating part 19 is provided on one side of the module body 15 and connected to any one of the module connecting parts 31, 32, 33 and 34 of the module station 20. That is, the mating part 19 is connected to one of the plurality of module connecting parts 31, 32, 33 and 34 provided on the module station 20, thereby preventing the work module 10 from moving. Accordingly, when the mobile robot 40 is docked with the work module 10, the work module 10 does not move. Because the constructions of the mating connecting part 19 of the work module 10 and the module connecting parts 31, 32, 33 and 34 of the module station 20 can implemented by employing various well-known methods including a method of using an electromagnet, detailed descriptions thereof are omitted.

The mating docking part 57 is provided on a different side of the module body 15 and connects with the module docking part 43 of the mobile robot 40. When the mating docking part 57 of the work module 10 is connected to the module docking part 43 of the mobile robot 43, the work module 10 is moved with the mobile robot 40, so that a given work task, which is instructed by a robot controller 46 of the mobile robot 40, can be performed. The module docking part 43 and the mating docking part 57 can be configured by employing electromagnets. In the present embodiment, the mating docking part 57 is formed in a shape of two cylindrical projections from a material, such as iron, that is attracted by a magnet. In addition, the module docking part 43 of the mobile robot 40 is formed to have the shape that corresponds to the mating docking part 57 of the work module 10. That is, the module docking part 43 is formed in a shape of two cylindrical grooves, into which the two cylindrical projections of the mating docking part 57 can be inserted. In addition, the module docking part 43 is formed from an electromagnet. Accordingly, if electric power is applied in the state in which the mating docking part 57 is inserted into the module docking part 43, the module docking part 43 is magnetized, thereby preventing the mating docking part 57 from disconnecting from the module docking part 43. At this time, the magnetic force of the module docking part 43 should be large enough so as to prevent the work module 10 from being removed from the mobile robot 40. Of course, the configuration of the module docking part 43 and the mating docking part 57 can be implemented using various well-known methods without employing an electromagnet.

The mating signal connection part 18 is provided proximate the mating docking part 57 on the side of the module body 15 where the mating docking part 57 is provided, and it is connected with a signal connection part 45 of the mobile robot 40. That is, if the module docking part 43 of the mobile robot 40 is joined with the mating docking part 57 of the work module 10, the signal connection part 45 of the mobile robot 40 and the mating signal connection part 18 of the work module 10 are interconnected with each other, whereby the robot controller 46 can control the work module 10.

The mating electric connection part 17 is provided in parallel to the mating signal connection part 18 neighboring the mating docking part 57 on the side of the module body 15 where the mating docking part 57 is provided, and connected to an electric connection part 44 of the mobile robot 40. That is, if the module docking part 43 of the mobile robot 40 is connected to the mating docking part 57 of the work module 10, the electric connection part 44 of the mobile robot 40 and the mating electric connection part 17 are interconnected with each other so that electric power can be supplied to the work module 10.

It is preferable to provide one or more auxiliary wheels 9 on the bottom side of the module body 15 for supporting the movement of the work module 10. The number of the auxiliary wheels 9 can be properly determined depending on the size of the work module 10.

By connecting a plurality of work modules 10 (11, 12, 13, and 14) as described above at predetermined positions, the module station 20 allows the mobile robot 40 to exchange the work modules 10 (11, 12, 13, and 14). Such a module station 20 comprises a base 22, a charge unit 21, a plurality of module connecting parts 31, 32, 33 and 34, a station signal transmitting/receiving part 39, and a station controller 29.

The charge unit 21 is connected to a commonly usable power source 8 and is used to charge a rechargeable battery 47 of the mobile robot 40. Therefore, the charge unit 21 has a charge terminal 23 to be connected with the chargeable battery 47. In addition, an identification member 24 (see FIG. 3) for identifying the position of the charge unit 21 is provided proximate the charge terminal 23. With reference to the identification member 24 of the charge unit 21, the mobile robot 40 can identify the position of the charge unit 21.

The plurality of module connecting parts 31, 32, 33 and 34 are provided on the front side of the base 22, in such a way that they respectively correspond to the plurality of work modules 10 (11, 12, 13 and 14) to be used. That is, each work module 11, 12, 13 and 14 is connected to one of the module connecting parts 31, 32, 33, and 34, respectively. Therefore, the module connecting parts 31, 32, 33 and 34 are formed having a shape that corresponds to the mating connecting parts 19 of the work modules 11, 12, 13 and 14, respectively. In addition, the identification members 25, 25, 27 and 28 (see FIG. 3) are provided proximate to the module connecting parts 31, 32, 33 and 34, respectively, so that the module connecting parts 31, 32, 33 and 34 can be identified. With reference to the identification members 25, 26, 27 and 28, the mobile robot 40 can determine which of the module connecting parts 31, 32, 33 and 34 has a certain work module. The module station 20 of the present embodiment has four module connecting parts 31, 32, 33 and 34. Referring to FIG. 1, there are provided four module connecting parts, i.e., first, second, third and fourth module connecting parts 31, 32, 33 and 34 for connecting a cleaning module 11, a scrubbing module 12, an air-cleaning module 13, a sterilizing module in this order from the under side of the charge unit 21.

The identification members 24, 25, 26, 27 and 28 for identifying the charge unit 21 and the plurality of module connecting parts 31, 32, 33 and 34 may be variously configured according to the configuration of a station detection part 49, which is provided on the mobile robot 40. For example, if a vision camera is employed as the station detection part 49, the identification members 24, 25, 26, 27 and 28 are formed by marks which can be perceived by the vision camera. If an ultrasonic sensor is employed as the station detection part 49, each of the identification members 24, 25, 26, 27 and 28 is formed by an ultrasonic wave signal transmitting component which transmits supersonic waves of a certain frequency, respectively.

A station signal transmitting/receiving part 39 receives a signal from a robot signal transmitting/receiving part 48 of the robot controller 46 and transmits the signal to the station controller 29. In addition, the station signal transmitting/receiving part 39 receives a signal from the station controller 29 and transmits the signal.

According to the signals of the robot controller 45, which are transmitted from the station signal transmitting/receiving part 39, the station controller 29 controls the plurality of module connecting parts 31, 32, 33 and 34, and the charge unit 21.

Figure 3:
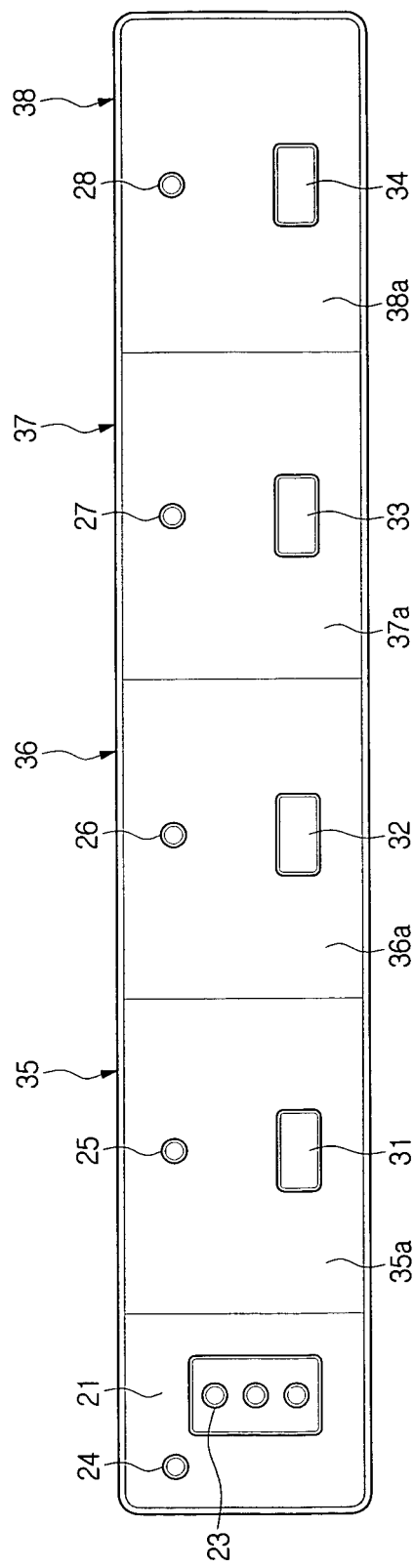
FIG. 3 is a front elevational view showing an embodiment of a module station of the mobile robot system shown in FIG. 1.
Figure 4:
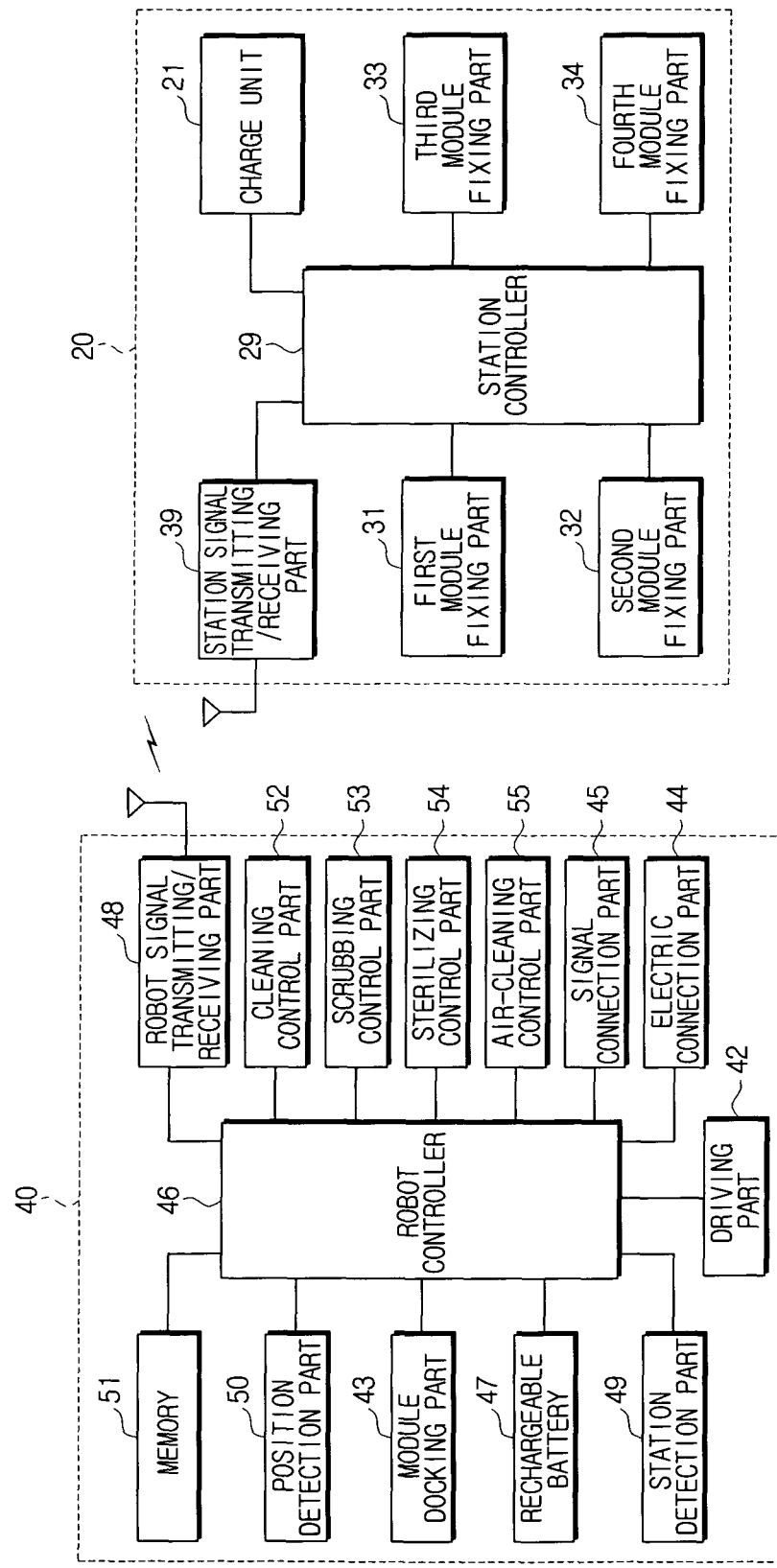
FIG. 4 is a functional block diagram of the mobile robot system shown FIG. 1.

Although it is possible to configure the module station 20 by providing the plurality of module connecting parts 31, 32, 33 and 34 on the base 22 as described above, it is also possible to configure the module station 20 by assembling the charge unit 21 with the plurality of modularized module connecting units 35, 36, 37 and 38, as shown in FIG. 3. At this time, each module connecting unit 35, 36, 37 and 38 comprises one module connecting part 31, 32, 33, and 34, one identification member 25, 26, 27, and 28, and a housing 35a, 36a, 37a, and 38a for supporting them. If the connecting units 35, 36, 37 and 38 are modularized in this manner, a user can optionally purchase and assemble one or more work modules 10 and one or more corresponding module connecting units 35, 36, 37 and 38 as desired, which is convenient for the user and advantageous in terms of cost.

Depending to a work to be done, the mobile robot 40 selects and connects to one of the plurality of work modules 11, 12, 13 and 14 from the module station 20, and then performs the work task while autonomously running. The mobile robot 40 comprises: a body 41, a driving part 42, a module docking part 43, an electric connection part 44, a signal connection part 45, a robot controller 46, a rechargeable battery 47, a robot signal transmitting/receiving part 48, a station detection part 49, and a position detection part 50.

The driving part 42 is provided in the body 41 and causes the mobile robot 40 to move under the control of the robot controller 46.

The module docking part 43 is provided on one side of the body 41; it is configured in such a way that it is connected with one 10 of the plural work modules 11, 12, 13 and 14. The module docking part 43 is formed in shape to correspond to the mating docking part 57 of the work module 10 as described above. In addition, in the present embodiment, the module docking part 43 is formed from an electromagnet and configured in such a way that the electric power applied from the rechargeable battery 47 can be turned ON/OFF by a signal from the robot controller 46.

The electric connection part 44 is provided proximate the module docking part 43 on the one side of the body 41 where the module docking part 43 is installed, and the electric connection part 44 is connected to the mating electric connection part 17 of the work module 10 so as to supply electric power to the work part 16 of the work module 10. The electric connection part 44 is configured by a connector and connected to the mating electric connection part 17 when the module docking part 43 is joined with the mating docking part 57.

The signal connection part 45 is provided proximate the electric connection part 44, which is provided on the one side of the body 41, and the signal connection part 45 is connected with the mating signal connection part 18 of the work module 10, thereby exchanging signals with the work part 16 of the work module 10. The signal connection part 45 is configured by a connector and connected with the mating signal connection part 18 when the module docking part 43 is joined with the mating docking part 57.

The robot controller 46 is provided in the body 41 and controls the driving part 42, the module docking part 43, the electric connection part 44, the signal connection part 45, the rechargeable battery 47, the robot signal transmitting/receiving part 48, the station detection part 49, and the position detection part 50.

The robot controller 46 detects a module connecting part, to which a certain work module 10 is joined, among the plurality of module connecting parts 31, 32, 33, and 34, using the station detection part 49. Then, the robot controller 46 controls the driving part 42, so that the module docking part 43 is inserted into the mating docking part 57 of the work module 10, thereby causing the work module 10 to be connected to the mobile robot 40.

In addition, the robot controller 46 detects the charged capacitance of the rechargeable battery 47, and then connects the rechargeable battery 47 to the charge terminal 23, if it is desired. At this time, the robot controller 46 identifies the position of the charge terminal 23, using the station detection part 49 and the identification member 24 of the module station 20.

The robot controller 46 comprises a cleaning control part 52, a scrubbing control part 53, a sterilizing control part 54, and an air-cleaning control part 55, so that the work module 10 joined to the mobile robot 40 can be controlled by the robot controller 46 so as to perform any given work. At this time, the robot controller 46 has a memory 51, in which is stored a plurality of moving paths, wherein the plurality of moving paths are previously set so as to most efficiently perform the respective work tasks. For example, if a work module 11, which is capable of performing cleaning (hereinafter, referred to as "cleaning module"), is connected to the mobile robot 40, the robot controller 46 controls the driving part 42 according to a moving path for the cleaning work among the plurality of moving paths stored in the memory 51. Then, the mobile robot 40 moves along a path which is most optimized for vacuum-cleaning, and during operation, the cleaning control part 52 controls the vacuum cleaning device of the cleaning module 11 so that the cleaning can be performed. That is, the robot controller 46 stores a plurality of moving paths, which are most optimized for the plurality of work modules 11, 12, 13 and 14, respectively, wherein the robot controller 46 selects a moving path corresponding to a work module connected to the module docking part 43 among the plurality of work modules 11, 12, 13 and 14, and causes the mobile robot 40 to operate along the selected moving path while performing the given work task.

The rechargeable battery 47 is a power supply for supplying required electric power to the components of the mobile robot 40. Although a rechargeable battery 47 is used as the power supply, a fuel cell or the like can be also used instead of such a rechargeable battery 47.

The robot signal transmitting/receiving part 48 receives a signal from the robot controller 46 and transmits it to an external device, and receives a signal transmitted from a remote controller (not shown) or a station signal transmitting/receiving part 39 and transmits it to the robot controller 46. The robot controller 46 controls the mobile robot 40 according to a command received from the remote controller, so that the commanded work can be performed. In addition, if the module docking part 43 is docked with the mating docking part 57, the robot controller 46 transmits a docking completion signal to the station signal transmitting/receiving part 39 through the robot signal transmitting/receiving part 48.

The station detection part 49 detects the positions of the charge unit 21, and the plurality of module connecting units 31, 32, 33 and 34 of the module station 20 using the identification members 24, 25, 26, 27 and 27 provided on the module station 20.

The position detection part 50 detects the current position of the mobile robot 40, using various well-known methods, such as a method of using a vision camera and a vision board.

A mobile robot system having a plurality of exchangeable work modules according to an embodiment of the present invention, each of which has the above-mentioned components, is now described with reference to accompanying drawings. FIG. 1 shows a state in which the air-cleaning module 13 is connected to the mobile robot 40.

If the mobile robot 40 receives a command to perform vacuum-cleaning, the robot controller 46 of the mobile robot 40 selects a work module to be used in vacuum-cleaning from among the plurality of word modules 11, 12, 13 and 14, i.e., the cleaning module 11. Then, the robot controller 46 judges whether the commanded work can be performed using the work module 10, which is presently connected to the docking part 43, or not. If the air-cleaning module 13 were connected to the mobile robot 40 as shown in FIG. 1, it is impossible to perform the commanded cleaning work task. Accordingly, the robot controller 46 exchanges the air-cleaning module 13 for the cleaning module 11. Now, it is described how the robot controller 46 exchanges the air-cleaning module 13 for the cleaning module 11.

First, the robot controller 46 confirms the position of the third module connecting part 33 of the module station 20 for removing and connecting the air-cleaning module 13, which is connected to the mobile robot 40. Then, if the robot controller 46 stores the position of the third module connecting part 33 for connecting the air-cleaning module 13, the controller 46 calculates the distance from the present position to the third module connecting part 33. Then, the robot controller 46 moves the mobile robot 40 along the calculated moving path and positions the air-cleaning module 13 at the third module connecting part 33 of the module station 40. Then, the robot controller 46 can move the mobile robot 40 and position the air-cleaning module 13 at the third module connecting part 33 by using the well-known method of returning a mobile robot to its charge device.

If the air-cleaning module 13 is positioned at the third module connecting part 33, the station controller 29 controls the third module connecting part 33 so as to connect the air-cleaning module 13. If connecting the air-cleaning module 13 is completed, the robot controller 43 turns off the power of the module docking part 43, and then controls the driving part 42, so that the mobile robot 40 is disconnected from the air-cleaning module 13 and then moves away from the module station 20.

Next, the robot controller 46 confirms the position of the first module connecting part 31 of the module station 20, where the cleaning module 11 is connected, and then calculates an optimal moving path for the mobile robot 40 to connect to the cleaning module 11. Then, the robot controller 46 controls the driving part 42, so that the module docking part 43 of the mobile robot 40 is inserted into the mating docking part 57 of the cleaning module 11. If the module docking part 43 is inserted into the mating docking part 57, the robot controller 46 applies power to the module docking part 43, thereby magnetizing the module docking part 43. Then, the cleaning module 11 is connected to the mobile robot 40 and will not be removed from the mobile robot 40 even if the mobile robot 40 performs the given work task while moving. The process for connecting the mobile robot 40 to the cleaning module 11 is similar to the well-known method of returning a mobile robot to its charge device.

If the connection between the module docking part 43 and the mating docking part 57 is completed, the robot controller 46 transmits a docking completion signal to the station controller 29. Then, the station controller 29 controls the first module connecting part 31, by which the cleaning module 11 is connected, so that the first module connecting part 31 releases the cleaning module 11. If the first module connecting part 31 releases the cleaning module 11, the robot control part 46 controls the driving part 42, so that the mobile robot 40 performs the cleaning work task according to the rendered command.

In addition, if it is desired to perform wiping with a scrubbing module, the robot controller 46 causes the cleaning module 11 to be removed from the mobile robot 40 and to be connected to the first module connecting part 31 of the module station 20, and then causes the mobile robot 40 to be joined with the scrubbing module 12. The process of connecting the scrubbing module 12 with the mobile robot 40 is similar to that described above in terms of the cleaning module.

Although processes for exchanging one work module for another where one work module is joined with the mobile robot 40 has been described above, the module robot 40 can also be connected to any one of the plurality of work modules 11, 12, 13, 14, which are connected to the module station 20. The process for connecting the mobile robot 40 with a work module 10 is identical to that described above.

Figure 5:
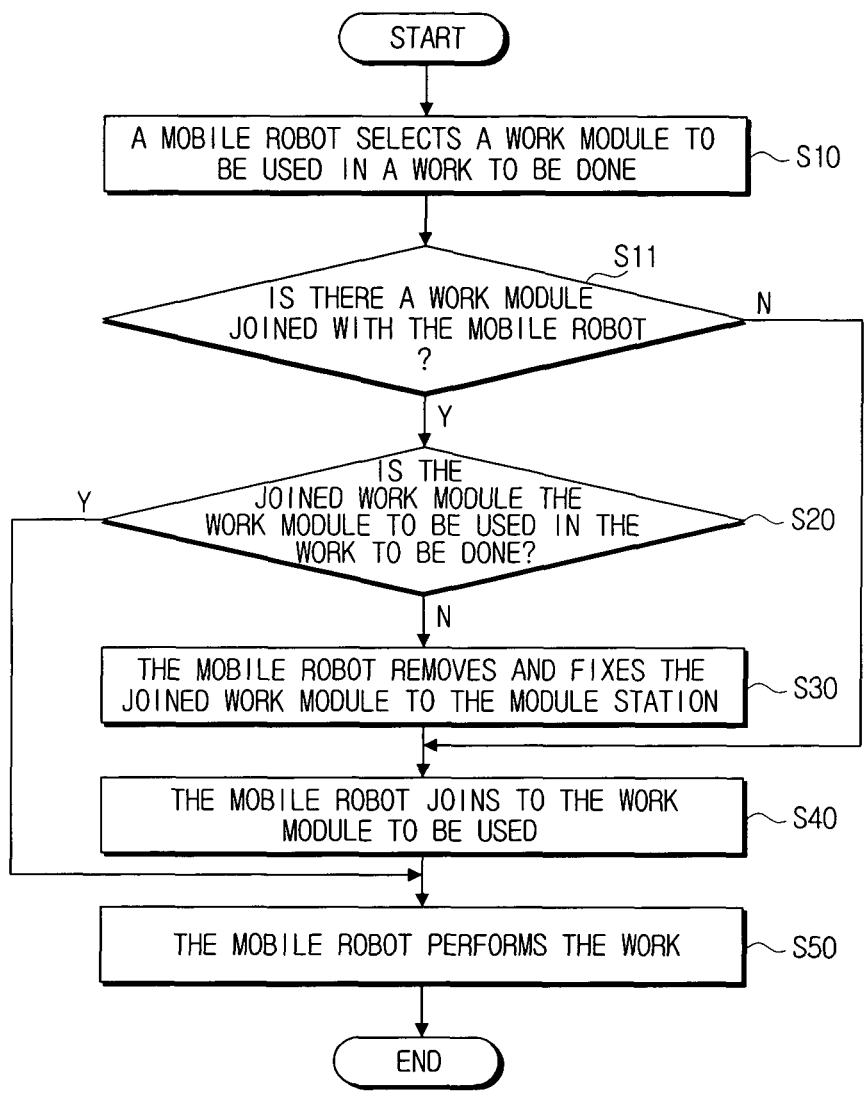
FIG. 5 is a flowchart showing a method of controlling a mobile robot system according to an embodiment of the present invention.
Figure 6:
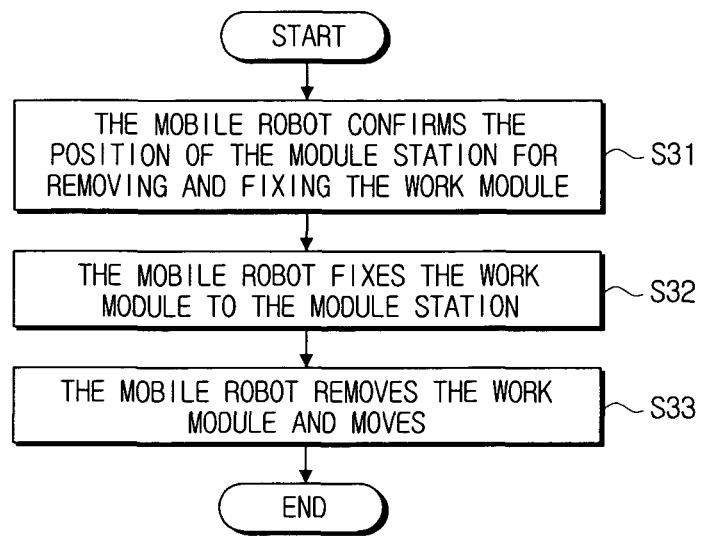
FIG. 6 is a flowchart showing the step of removing and connecting a work module in the control method shown in FIG. 5.
Figure 7:
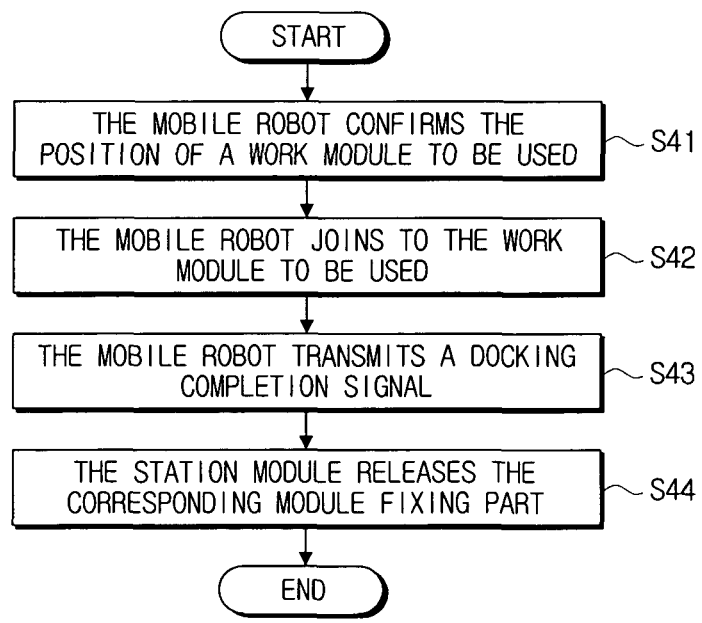
FIG. 7 is a flowchart showing the step of connecting a work module in the control method shown in FIG. 5.

Now, an embodiment of a method of controlling a mobile robot system having a plurality of exchangeable work modules in terms of another aspect of the present invention is described in detail with reference to FIGS. 5 to 7.

With the above-mentioned mobile robot system 1 having a plurality of exchangeable work modules, upon receiving a work command, the robot controller 46 of the mobile robot 40 selects a work module 10 to be used for a commanded work task (S10). Next, the robot controller 46 judges whether the work module 10 is connected to the mobile robot 40 or not (S11). If the work module 10 is not joined to the mobile robot 40, the robot controller 46 causes the mobile robot 40 to connect to the work module 10 to be used (S40).

However, if the work module 10 is joined to the mobile robot 40, the robot controller 46 judges whether the presently connected work module 10 is the work module to be used for the commanded work task or not (S20). For example, upon receiving a cleaning command, the robot controller 46 judges whether the work module 10, which is connected to the module docking part 43 of the mobile robot 40, is the cleaning module 11 or not. If the presently joined module 10 is the cleaning module 11, the robot controller 46 controls the driving part 42 and the work part 16 of the work module 10, so that the work module 10 performs the commanded work task (S50).

However, if the presently joined module 10 is not the cleaning module 11, the robot controller 46 of the mobile robot 40 causes the connected work module 10 to be removed and connected to the module station 20 (S40). This operation is described in more detail with reference to FIG. 6.

The robot controller 46 of the mobile robot 40 confirms the position of a corresponding module connecting part for removing and connecting the work module 10 among the plurality of module connecting parts 31, 32, 33 and 34 of the module station 20 (S31). Next, the robot controller 46 controls the driving part 42, so that the work module 10 is positioned at the corresponding module connecting part and then connects to the module station 20 (S32). Then, the robot controller 46 controls the driving part 42 and the module docking part 43, so that the mobile robot 40 is separated from the work module 10 and then moves (S33). At this time, it is preferable that the robot controller 46 controls the mobile robot 40 in such a way that the mobile robot 40 is moved to the most suitable position for connecting to a work module 10 to be used for the commanded work task.

If the removal of the work module 10 is completed, the robot controller 46 controls the mobile robot 40, so that the mobile robot 40 connects to the work module 10 to be used in the commanded work task (S40). This operation is now described in detail with reference to FIG. 7.

The robot controller 46 of the mobile robot 40 confirms the position of the corresponding module connecting part of the work module 10 to be used among the plurality of module connecting parts 31, 32, 33 and 34 of the module station 20 (S41). Next, the robot controller 46 controls the driving part 42 so that the mobile robot 40 moves to where the corresponding module connecting part to be used is located, and then connects to the work module 10 (S42). At this time, the mating docking part 57 of the work module 10 is inserted into and joined with the module docking part 43 of the mobile robot 40 by the magnetic force of the module docking part 43. If the connection of the work module 10 to be used with the mobile robot 40 is completed, the robot controller 46 of the mobile robot 40 transmits a docking completion signal (S43). Then, the station controller 29 of the module station 20 releases the work module 10 to be used from the module connecting part thereof (S44). If the work module 10 is released from the corresponding module connecting part, the mobile robot 40 moves and performs the commanded work task (S50).

According to the present invention, because a mobile robot is adapted to perform a given work task while moving, only one work module among various work modules, which have different functions, respectively, is needed. Therefore, the size and weight of the mobile robot are not increased as compared with a conventional mobile robot.

Moreover, the inventive mobile robot can select a work module capable of performing a required function from a plurality of work modules, which are connected to a module station and have various functions. Therefore, it is possible to perform various work tasks as desired by a user. Accordingly, it is possible to perform various work tasks without substantially increasing the manufacturing costs of the mobile robot.

Furthermore, according to the present invention, it is possible to extend the function of a mobile robot by purchasing one or more work modules as desired by the user because the work modules and the module station are modularized according to the functions thereof. That is, it is possible for a user initially to purchase a module station having a charge unit and a module connecting part, and a mobile robot having a cleaning module, and then to purchase a scrubbing module and another module connecting part, thereby extending the module station, so that the function of the mobile robot can be extended from the cleaning function to the scrubbing function. Therefore, burden of cost imposed on the user is not significant.

Although representative embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

We claim:

1. A mobile robot system having a plurality of exchangeable work modules comprising:
    a plurality of work modules, each of which is adapted to performing a different work task;
    a module station comprising a plurality of module connecting parts for fixing the plurality of work modules to the module station, and a station control unit for controlling the plurality of module connecting parts, wherein each of the module connecting parts are aligned in the same plane; and
    a mobile robot which is adapted for selecting, moving and connecting to one of the plurality of work modules of the module station according to the work task to be performed and communicating with the station control unit of the module station to cause the module connecting part of the selected work module to release the work module, wherein a direction in which the mobile robot moves to connect to one of the plurality of work modules is different from directions in which the mobile robot moves to connect to each of the other work modules and the mobile robot autonomously runs to perform the work task.

2. The mobile robot system as claimed in claim 1, wherein the mobile robot comprises:
    a body;
    a driving part provided in the body;
    a module docking part provided on one side of the body adapted to connecting to one of the plurality of work module;
    an electric connection part located proximate the module docking part on the one side of the body adapted to supplying electric power to the work module when it is connected to the mobile robot;
    a signal connection part located proximate the electric connection part adapted to exchanging signals with the work module when it is connected to the mobile robot; and
    a robot controller provided in the body adapted to controlling the driving part, such that when the module docking part, the electric connection part, and the signal connection part are connected to the one of the plurality of work modules, the mobile robot performs the work task.

3. The mobile robot system as claimed in claim 2, wherein the robot controller stores a plurality of moving paths, each of which corresponds to at least one of the plurality of work modules and wherein the robot controller selects one of the plurality of moving paths corresponding to the work module connected to the module docking part from the plurality of moving paths and thereby causes the mobile robot to operate along the selected moving path and perform the work task.

4. The mobile robot system as claimed in claim 2, wherein each of the plurality of work modules comprises:
    a module body;
    a work part provided in the module body adapted to performing the work task;
    a mating connection part provided on one side of the module body to be connected to a corresponding module connecting part of the module station;
    a mating docking part provided on a different side of the module body to be connected to the module docking part of the mobile robot;
    a mating signal connection part and a mating electric connection part provided on the different side of the module body, the mating signal connection part and the mating electric connection part being connected to the signal connection part and the electric connection part of the mobile robot, respectively.

5. The mobile robot system as claimed in claim 4, wherein the work parts of the plurality of work modules comprise one of a vacuum-cleaning device, a scrubbing device, a sterilizing device, and an air-cleaning device.

6. The mobile robot system as claimed in claim 4, wherein the module docking part is an electromagnet.

7. A method of controlling a mobile robot system comprising the steps of:
    a) causing a mobile robot to select a work module to be used in performing a given work task;
    b) causing the mobile robot to move toward the selected work module which is fixed to a module station;
    c) causing the mobile robot to connect to the selected work module which is fixed to the module station via a module connecting part, and to communicate with the station control unit of the module station to cause the module connecting part to release the selected work module; and
    d) causing the mobile robot to perform the given work task using the work module after it is connected to the mobile robot,
    wherein a direction in which the mobile robot moves to connect to one of the plurality of work modules is different from directions in which the mobile robot moves to connect to each of the other work modules, and wherein the module station comprises a plurality of module connecting parts for fixing a plurality of work modules to the module station, the module connecting parts being aligned in the same plane.

8. The method as claimed in claim 7, further comprising the steps of:
    e) determining whether a work module connected to the mobile robot is the work module to be used in performing the given work task;
    f) causing the mobile robot to remove the work module connected to the mobile robot if the work module is not the work module to be used in performing the given work task, and connecting the removed work module to the module station.

9. The method as claimed in claim 8, wherein step f) comprises the steps of:
    causing the mobile robot to confirm a position in the module station to be used for removing and connecting the work module, which is connected to the mobile robot, to the module station;

causing the mobile robot to connect the work module, which is connected to the mobile robot, to the confirmed position in the module station; and causing the mobile robot to remove the work module and then move away from the module station.

10. The method as claimed in claim 7, wherein step c) comprises the steps of:

confirming the position of the work module to be used in performing the given work task by the mobile robot;

causing the mobile robot to move and connect to the work module to be used in performing the given work task;

causing the mobile robot to transmit a docking completion signal; and causing the module station to release the work module to be used by the mobile robot, when the docking completion signal is received.

11. A mobile robot system comprising:

a mobile robot adapted to autonomously operating in an environment; and a module station for positioning a plurality of work modules, wherein each of the plurality of work modules is adapted to performing a different work task, wherein the mobile robot comprises:

a module docking part adapted to connecting to one of the plurality of work modules, an electric connection part located proximate the module docking part adapted to supplying electric power to the one of the plurality of work modules; a signal connection part located proximate the electric connection part adapted to communicating with the one of the plurality of work modules; and a robot controller for causing the mobile robot to performing a sequence of instructions, wherein the module station comprises a plurality of module connecting parts for fixing the plurality of work modules to the module station, and a station control unit for controlling the plurality of module connecting parts, wherein each of the module connecting parts are aligned in the same plane, and wherein the mobile robot selects one of the plurality of work modules of the module station according to the work task to be performed, moves toward the selected work module, connects to the selected work module through the module docking part, communicates with the-station control unit of the module station to cause the module connecting part of the selected work module to release the work module, and autonomously runs to perform the work task, wherein a direction in which the mobile robot moves to connect to one of the plurality of work modules is different from directions in which the mobile robot moves to connect to each of the other work modules.

12. The mobile robot system as claimed in claim 11, wherein the robot controller stores a path corresponding to at least one of the plurality of work modules, and wherein the robot controller is adapted to automatically selecting one of the plurality of paths corresponding to the work module connected to the module docking part that causes the mobile robot to operate along the selected path and perform the work task.

13. The mobile robot system as claimed in claim 11, wherein each of the plurality of work modules comprises a mating signal connection part and a mating electric connection part, wherein the mating signal connection part and the mating electric connection part are adapted to being connected to the signal connection part and the electric connection part of the mobile robot, respectively.

14. The mobile robot system as claimed in claim 11, wherein at least one of the plurality of work modules comprises a vacuum-cleaning device.

* * * * *